(12) United States Patent
Lehnhoff

(10) Patent No.: US 10,934,680 B2
(45) Date of Patent: Mar. 2, 2021

(54) QUICK-CHANGE DEVICE

(71) Applicant: Lehnhoff Hartstahl GmbH, Baden-Baden (DE)

(72) Inventor: Peter-Alexander Lehnhoff, Buehl (DE)

(73) Assignee: LEHNHOFF HARTSTAHL GMBH, Baden-Baden (DE)

( * ) Notice: Subject to any disclaimer, the term of this patent is extended or adjusted under 35 U.S.C. 154(b) by 534 days.

(21) Appl. No.: 15/735,194

(22) PCT Filed: Jun. 10, 2016

(86) PCT No.: PCT/EP2016/063354
§ 371 (c)(1),
(2) Date: Dec. 10, 2017

(87) PCT Pub. No.: WO2016/198638
PCT Pub. Date: Dec. 15, 2016

(65) Prior Publication Data
US 2018/0298583 A1    Oct. 18, 2018

(30) Foreign Application Priority Data

Jun. 12, 2015 (DE) ................. 10 2015 210 860.0

(51) Int. Cl.
*E02F 3/36* (2006.01)
*F16H 21/24* (2006.01)
*F15B 15/06* (2006.01)

(52) U.S. Cl.
CPC ............ *E02F 3/3627* (2013.01); *E02F 3/364* (2013.01); *E02F 3/365* (2013.01); *E02F 3/3613* (2013.01);
(Continued)

(58) Field of Classification Search
CPC ..... E02F 3/3604; E02F 3/3609; E02F 3/3622; E02F 3/3627; E02F 3/3654; E02F 3/3663
See application file for complete search history.

(56) References Cited

U.S. PATENT DOCUMENTS

2012/0128404 A1* 5/2012 Sonerud ............... E02F 3/3654
403/31

FOREIGN PATENT DOCUMENTS

DE    4214569    12/1993
DE    9314409    4/1994
(Continued)

OTHER PUBLICATIONS

Translation of DE 93 14 409. worldwide.espacenet.com. Jun. 12, 2020.*
(Continued)

*Primary Examiner* — Michael P Ferguson
(74) *Attorney, Agent, or Firm* — Woodling, Krost and Rust

(57) ABSTRACT

The invention relates to a quick-change device (IO) having at least one locking bolt (26) and a motor drive which moves the locking bolt (26) into a locking position and an unlocking position, wherein the drive (16) has an energy connection (28a, 28b) and output means (34) interacting with the locking bolt (26), wherein the drive (16) comprises a rotary drive (30) having a motor and an output shaft (34), wherein the output shaft (34) is mechanically connected to the locking bolt (26), with the result that the locking bolt (26) is movable along an actuation axis. The invention is distinguished by the fact that the drive (16) has an attachment (20) for a shaft-hub connection, on which attachment a tool for manual actuation can be mounted, with the result that a manual actuation acts directly on the output shaft (34) and here the attachment (20) is arranged coaxially to a rotary connection (32a, 32b) of a gear shaft (32c, 32d).

7 Claims, 4 Drawing Sheets

(52) U.S. Cl.
CPC .......... *E02F 3/3622* (2013.01); *E02F 3/3663* (2013.01); *E02F 3/3668* (2013.01); *E02F 3/3672* (2013.01); *F16H 21/24* (2013.01); *F15B 15/068* (2013.01)

(56) References Cited

FOREIGN PATENT DOCUMENTS

| | | | |
|---|---|---|---|
| DE | 9315868 | 3/1995 | |
| DE | 10222815 | 12/2003 | |
| DE | 10261225 | 7/2004 | |
| DE | 102004004897 | 8/2005 | |
| EP | 0569026 | 5/1993 | |
| EP | 2192239 | 11/2009 | |
| FR | 1341239 | 9/1963 | |
| WO | WO 2005/093171 | * 10/2005 | ................ E02F 3/36 |

OTHER PUBLICATIONS

European Patent Office, European Search Report, dated Sep. 29, 2016, pp. 1-12, Application No. PCT/EP2016/063354, Applicant: Lehnhoff Hartstahl GMBH & Co. KG.

The International Bureau of WIPO, Translation of the Written Opinion of the International Searching Authority,dated Sep. 29, 2016, pp. 1-8, Application No. PCT/EP2016/063354, Applicant: Lehnhoff Hartstahl GMBH & Co. KG.

German Patent No. DE 9314409 U1, English Translation, Patent Release Date Apr. 21, 1994, pp. 1-4.

* cited by examiner

QUICK-CHANGE DEVICE

PCT/EP2016/063354, international application filing date Jun. 10, 2016 and German patent application no 10 2015 210 860.0 filed Jun. 12, 2015 are incorporated herein by reference hereto in their entireties.

This patent application is the national phase entry of PCT/EP2016/063354, international application filing date Jun. 10, 2016, which claims the benefit and priority of and to German patent application no 10 2015 210 860.0 filed Jun. 12, 2015.

BACKGROUND

Field of the Invention

The invention relates to a quick-change device.

Description of the Related Art

Known from WO 2011/019312 A1 is a quick-change device for construction machinery, which quick-change device has locking bolts which are hydraulically driven. The locking bolts are adapted to engage in an adapter mounted on a tool, for locking the tool. According to this teaching, these locking bolts are displaced linearly by means of hydraulic cylinders for the purpose of locking an adapter.

DE 93 14 409.1 U1 discloses a generic quick-change device for construction machinery, which device includes a hydraulically driven mechanical dead-center lock with spring-mounted locking bolts. The dead-center lock is designed as a toggle lever mechanism and adapted to be moved into both dead-center positions by a hydraulic cylinder. According to this teaching, the locking bolts are secured in their locking and unlocking positions through the dead-center positions of a toggle-lever mechanism, with the adapter housing serving as a stop point for the toggle-lever mechanism.

DE 93 15 868.8 U1 discloses a quick-change device which has locking bolts comprising centrically located threaded holes with left-hand and right-hand threads. A spindle which connects both locking bolts is threaded into the threaded holes. The spindle is adapted to be driven either manually by means of a polygonal screw head positioned at at least one end of the spindle and a crank key, or by a motor, by means of a gear positioned in the central portion of the spindle. According to this teaching, the locking bolts are displaced by means of a spindle drive so as to lock an adapter, which spindle can either be operated manually or driven by a motor.

DE 42 14 569 C1 discloses a quick-change device for construction machinery in which the control shaft of the locking device can be driven either mechanically or hydraulically.

BRIEF SUMMARY OF THE INVENTION

It is the object of the invention to provide improved flexibility for adjusting the locking characteristics.

As is known, the quick-change device comprises at least a locking bolt and a motor drive which displaces the locking bolt into a locking position and an unlocking position along an actuation axis. The drive has an energy connection and output means interacting with the locking bolts, and is preferably designed as a rotary drive having a motor and an output shaft. The output shaft is mechanically connected to the locking bolt.

Converting the supplied energy into a rotary movement before the latter is again converted into a linear movement of the locking bolt creates improved opportunities to exert influence which may affect both the rotary movement component and the linear movement component.

According to the invention, the drive has an attachment for a shaft-hub connection, on which attachment a tool such as a manual lever for manual operation can be mounted, which attachment is extends coaxially relative to the rotary connection, with the result that a manual actuation acts directly on the drive shaft. The drive can thus be moved manually, which makes it possible to operate the quick-change device even in case of failure of the motorized energy source of the rotary drive. More specifically, the attachment is integrally formed with a rotary connection. This results in a particularly compact design.

According to an advantageous embodiment of the invention, at least two locking bolts are provided which are mechanically connected to the rotary drive in such a manner that the manual movement is transferred to the two locking bolts, which has the advantage that the locking bolts can be operated synchronously with one tool.

More specifically, the rotary drive can be formed as a fluid drive, in particular a hydraulic or a pneumatic rotary drive. Above all hydraulic supply energy is regularly provided in construction vehicles. A fluid rotary drive of this type has two fluid operating connections for operation.

Preferably, the rotary drive can comprise a piston whose linear movement is converted into a rotary movement of an output shaft by means of transmission means, in particular helical gearing. Rotary drives of this type have the advantage that they operate at low speed and allow a precise adjustment to be made in a small rotational angle range.

According to an advantageous embodiment of the invention, the two fluid operating connections of the rotary drive can be interconnected by a bypass comprising a switch valve for opening and closing the bypass.

In a closed state of the switch valve, fluidic operation can take place without any further intervention. For manual operation, the switch valve needs to be opened to enable a fluid flow between the two operating connections of the rotary drive, which causes the output shaft to move freely. This ensures safe fluidic operation and still allows manual opening in an emergency.

If the rotary drive comprises a cylinder, the chambers separated from each other by the piston can be provided with a fluid operating connection. The fact that the operating connections are interconnected ensures that the locking bolt can also be operated manually in case there is a problem with the energy supply of the rotary drive, since it allows fluid to flow from the one chamber to the other.

It is advantageous for the rotary drive to be retained fluidically, in particularly hydraulically, in the end positions of the drive. For holding the load, in particular pressure-controlled check valves are provided. Pressurization in the end position of the drive in the open position provides additional safety, thus preventing unintentional movement due to vibrations, impacts or other forces acting from outside. This increases the overall safety of the quick-change device.

It is expedient for the output shaft to interact with the locking bolt via a gear which moves over a dead center during each locking and unlocking step. This increases the certainty that the locking position will be retained. The gear in particular includes a rotary connection for introducing a rotary movement into the gear, which rotary connection is adapted to be connected to the output shaft of the rotary drive. The rotary connection can be formed as a gear shaft or designed as a mount for a shaft.

Preferably, the gear can be constituted by a toggle-lever mechanism. Firstly, relatively small forces are required for actuation by means of a toggle-lever mechanism. Secondly, toggle-lever mechanisms are relatively insensitive regarding harmful influences such as contamination and insufficient lubrication and do not place high demands on dimensional accuracy.

Furthermore, a mechanical stop can be provided, in particular beyond the dead center, which stop limits the movement of the drive towards the locking position. As a result, the final position of the drive, and hence the maximum extended position, can be defined, which ensures safe operation.

In yet another advantageous embodiment, the gear, which includes a rotary connection, has a mechanical stop in its locking position, which stop is formed by the rotary connection and by part of the toggle-lever mechanism, which gear includes a coupling element that is provided with a stop projection which constitutes part of the stop of the gear. The projection may be designed such that the resulting force of the locking bolt, which latter is acted upon along the actuation axis, is introduced into it radially relative to the rotary connection of the gear. As a result, no torque will be applied to the rotary connection by the resulting force. This thus makes the locking of the quick-change device particularly safe.

It is furthermore considered advantageous for the stop to be designed such that the resulting force will be radial with respect to the rotary connection, at an angle of between 30° and 40°, preferably of 34°, relative to the parallel to the actuation axis through the rotary connection axis.

It has proven advantageous for the output shaft of the drive to be oriented orthogonally to the actuation axis of the locking bolt. This arrangement leaves free space in the central area of the quick-change device, thus making the latter available for hydraulic couplings, for example.

In another aspect of the invention, at least two locking bolts are provided which are each connected to a gear having a rotary connection. The rotary connections are adapted to be connected to the output shaft. In this way, two locking bolts can be operated synchronously by one rotary drive.

In a particularly advantageous embodiment, the rotary connections can be interconnected via the rotary drive which rotary drive provides two connections to an output shaft, for example. This has the advantage of a particularly compact design. Alternatively, the rotary drive can also be coupled to a shaft interconnecting the two rotary connections, for example by means of a V-belt.

Preferably, the output shaft is detachably connected to the gear, thus allowing replacement of the rotary drive. This facilitates maintenance and repair of the rotary drive. Removing the rotary drive also allows modular conversion to a purely mechanical embodiment. For this purpose, the two rotary connections can be interconnected via a shaft/rod such that, when the gear is operated manually, in particular via a projection integrally formed on the rotary connection, this will cause the two locking bolts to move synchronously.

In an advantageous embodiment of the invention, a spring is connected between the gear and the locking bolt, which spring preloads the locking bolts in the direction of the locking position. Firstly, this increases the possible displacement path of the locking bolt. Secondly, this allows the two locking bolts to be positioned more precisely in the axial direction, which makes for safer locking. Furthermore, the movement of the two synchronously guided locking bolts will be decoupled by the springs to such an extent that—despite manufacturing tolerances and operation-related wear—reliable contact on the respective bolt shaft is guaranteed for both locking bolts. This serves to accomplish a safe connection at any time.

It is expedient to provide a stop for limiting the displacement path of the locking bolt in the unlocking direction, which displacement path is defined by the returning force acting on the locking bolt. This allows a defined end position to be set, and with appropriate dimensions, the displacement path of the springs to be limited so as to prevent spring overload. In contrast to a known cylinder drive, this no longer requires the entire retaining force of the motor. Interposing a spring results in the drive to be decoupled from the operating forces acting on the locking bolt. Once the limit of the spring deflection path has been reached, this will prevent opening of the quick-change device since the toggle-lever mechanism introduces the forces in the locking direction and the gear furthermore also includes a stop which acts in the locking direction.

It is considered advantageous to limit the range of rotation of the rotary drive. This makes it possible to choose a compact as possible design for the necessary range of rotation which depends on the geometries of the gear and the linear displacement path of the one or plural locking bolt(s). A limitation to a range of between 0° and 110° and of between 0° and 130° has proved particularly advantageous.

Additional advantages, features and possible applications of the present invention may be gathered from the description which follows, and by reference to the embodiments illustrated in the drawings.

BRIEF DESCRIPTION OF THE SEVERAL VIEWS OF THE DRAWINGS

Throughout the description, the claims and the drawings, the reference characters used are listed in the List of Reference Characters below. In the drawings.

DETAILED DESCRIPTION OF THE INVENTION

Figure 1:
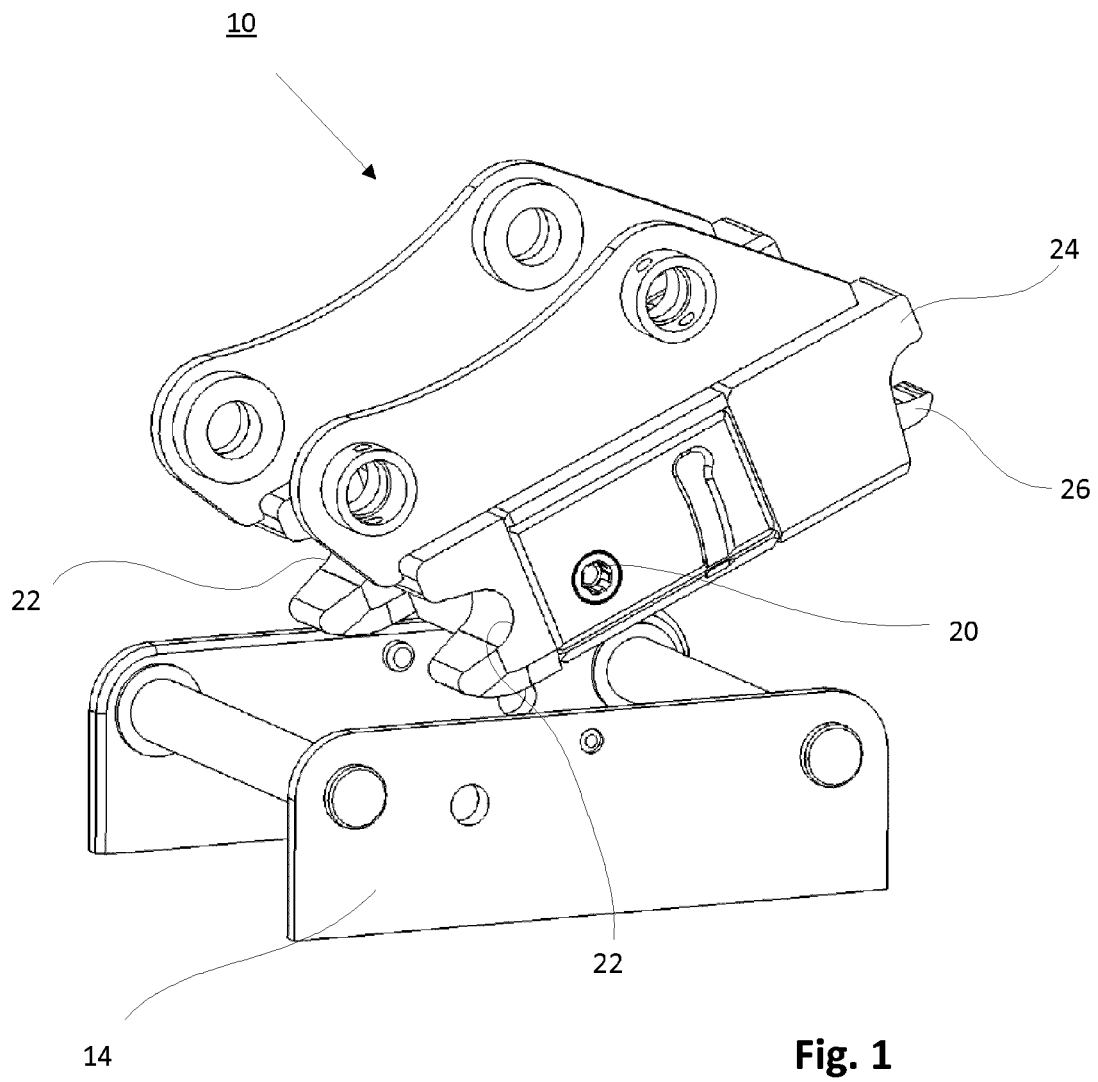
FIG. 1 is a perspective view of a quick-change device according to the invention and an adapter.

FIG. 1 is a perspective view of the quick-change device 10 and of a quick-change adapter 14.

The quick-change adapter 14 comprises two parallel cylindrical transversal rods.

The quick-change device 10 has claws 22 at a first end thereof, which claws 22 engage around a first transversal rod of the quick-change adapter 14, and at its end opposite the first end, the quick-change device 10 has a receiving unit which acts to secure a second transversal rod of the quick-change adapter 14 between an abutment 24 and two axially displaceable locking bolts 26, thus connecting the quick-change adapter 14 to the quick-change device 10.

In its longitudinal extent relative to a central axis M, the quick-change device 10 is essentially of an axially symmetrical design.

Each locking bolt 26 can be retracted into an unlocking position and extended into a locking position by means of the drive which will be explained with reference to the following Figures. Furthermore, at an attachment 20 is provided on the side which can be engaged by a tool (manual lever) so as to actuate the drive 16 in a purely mechanical manner and thus effect movement of the locking bolts 26.

Figure 2:
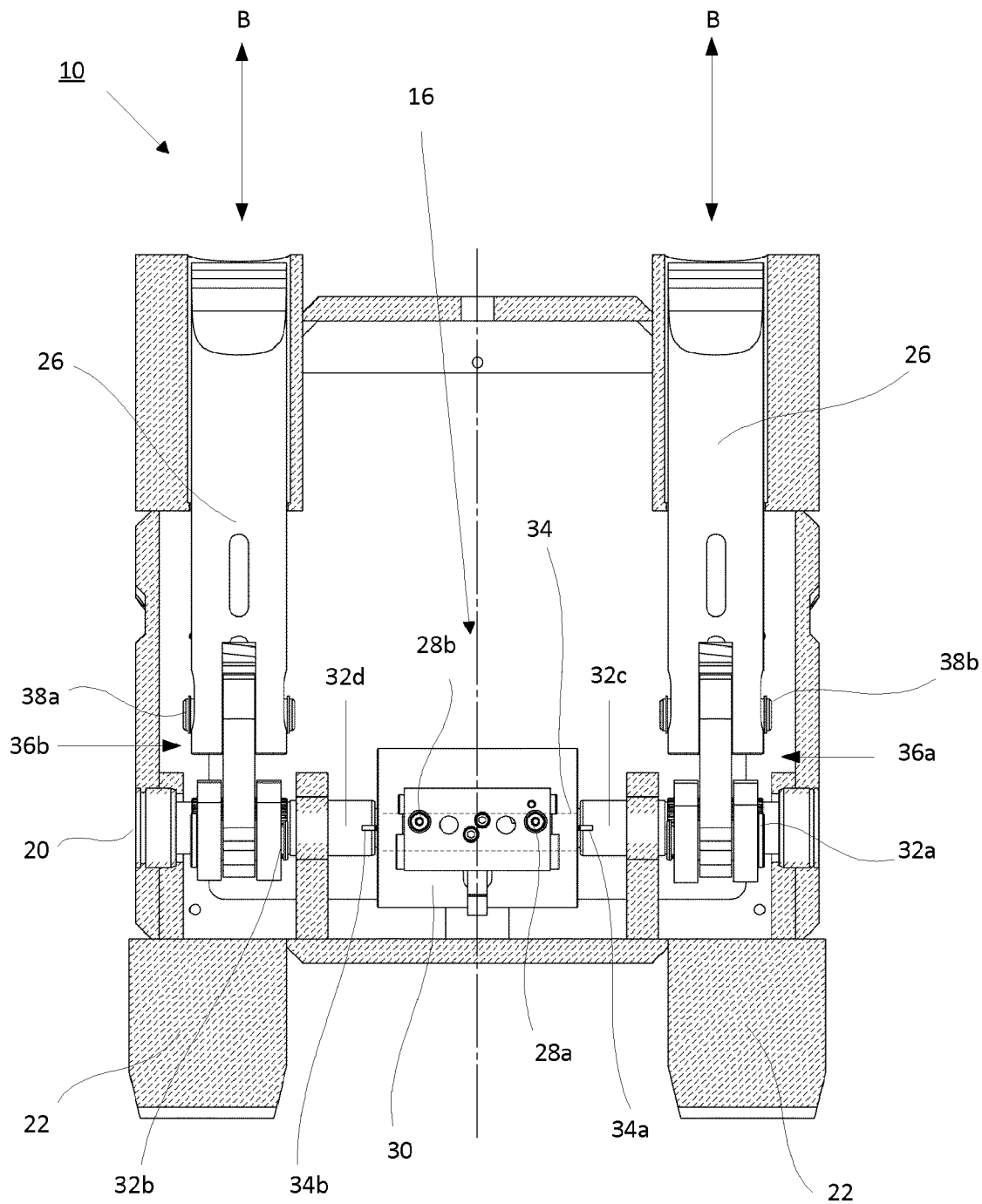
FIG. 2 is a schematic top view of the drive.

FIG. 2 is a schematic top view of the quick-change device 10, in which the housing of the quick-change device 10 has been cut open to expose the drive 16. This view also shows the claws 22 which are adapted to engage around a first transversal rod, as well as the locking bolts 26 which are fixable so as to locate the second transversal rod in position. The locking bolts 26 are adapted to be displaced along the actuation axis B by the drive 16. The drive 16 comprises a rotary drive 30 which is penetrated by an output shaft 34, and two coupling connections 34a, 34b for coupling the gear shaft 22 to the output shaft 34 for picking off the rotary movement. The output shaft 34 is indicated by a dashed line in FIG. 2. The gear shaft 32 is of a two-part design. A first part 32c of the gear shaft 32 has the connection 34a and another connection 32a, which will be explained in more detail below. A second part 32d of the gear shaft 32 has the connection 34b and another connection 32b, which will likewise be explained in more detail below.

Furthermore, the drive 16 comprises two toggle-lever mechanisms 36a, 36b which each are connected to a locking bolt 26 in such a manner that rotary movement of the output shaft 34 via the gear shaft 32 results in a linear movement of the respective locking bolt 26. The rotary drive 30 is provided in the form of a hydraulic rotary drive and has two hydraulic energy connections 28a, 28b. The toggle-lever mechanism 36a, 36b is connected to the rotary connection 32a, 32b of the gear shaft 32 which latter is used to introduce the rotary movement into the toggle-lever mechanism 36a, 36b. Parts 32c and 32d of the gear shaft 32 are detachably connected to the output shaft 34 via plug connections constituting the output connections 34a, 34b of the output shaft 34 or via a flange each, for example. One part 32c or both parts 32d of the gear shaft 32 can comprise an attachment 20. The attachment 20 is arranged coaxially relative to the gear shaft 32. In the case of manual operation, the driving force introduced via the attachment 20 will be directly transmitted to the one part 32c or 32d of the gear shaft 32, via the output shaft 34 and to the rotary drive 30 to the other part 32d or 32c, resp. of the gear shaft 32. The gear shaft 32 and the output shaft 34 are arranged coaxially relative to each other.

For this purpose, the rotary drive 30 has to allow an idle mode. Potential implementations for a respective behavior are described below with reference to FIG. 4.

Because the rotary drive 30 is detachably mounted, the rotary drive 30 can be replaced in the case of a defect, or the quick-change device 10 can be converted into a purely mechanical version thereof, by non-rotatably connecting the gear shafts 32a, 32b, which version can then exclusively be operated via the attachment 20.

The locking bolts 26 are movably guided with respect to the associated toggle-lever mechanism 36a, 36b, in which case the linear movement of each locking bolt 26 is limited in the actuation direction B on either side by an associated stop pin 38a and/or 38b.

The combination of the toggle-lever mechanisms 36a, 36b with a hydraulic rotary drive 30 creates a hydromechanical quick-change device.

Figure 3A:
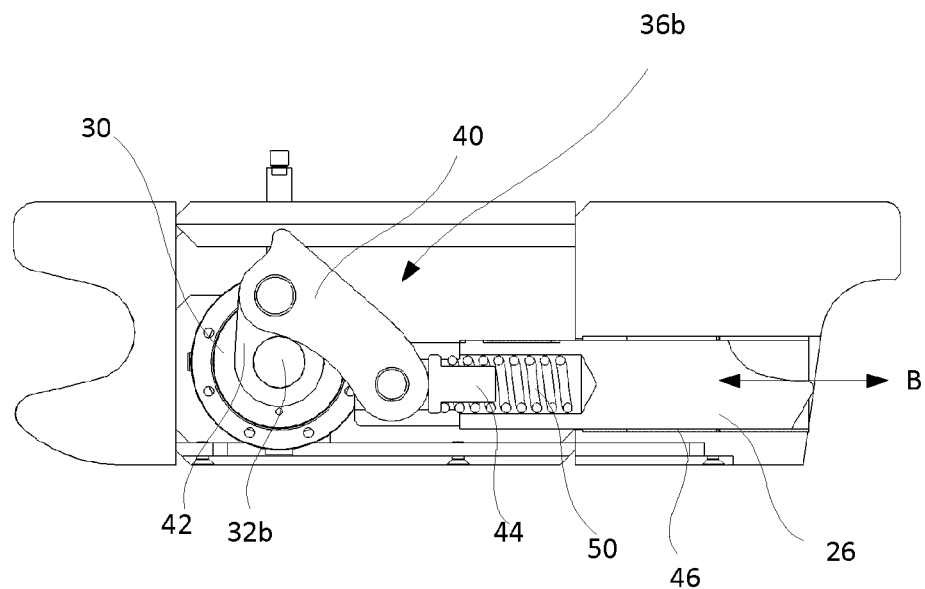
FIG. 3a is a lateral view of the retracted drive.
Figure 3B:
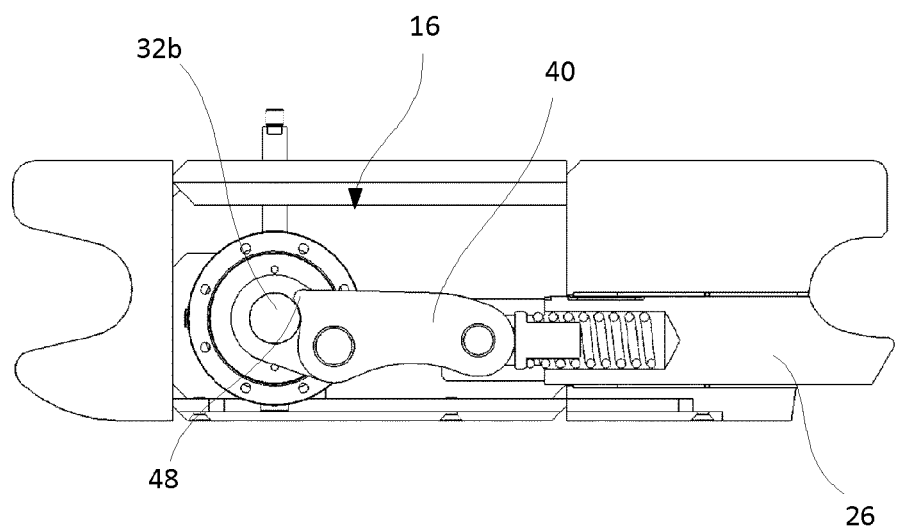
FIG. 3b is a lateral view of the extended drive.

FIGS. 3a and 3b are lateral sectional views of the drive 16, with FIG. 3a showing the visible locking bolt 26 in its retracted state and FIG. 3b showing the bolt 26 in its extended state.

The toggle-lever mechanism 36b has a lever 42 which is non-rotatably connected to the gear shaft 32b. The lever 42 is connected to the respective locking bolt 26 via a coupling element 40 which is rotationally supported on the lever 42. A locking bolt support 44 is rotatably supported on the coupling element 40. Each locking bolt 26 is guided along the actuation axis B in a sliding sleeve 46. Each locking bolt 26 is connected to the locking bolt support via a spring 50 which preloads the locking bolt 26 in the locking direction relative to the locking bolt support 44. Rotation of the rotary drive 30 in an angular range of 0° in the starting position up to approx. 120° causes the locking bolt 26 to be fully extended.

FIG. 3b is a view of the drive 16 in an extended state thereof. The coupling element 40 is provided with a stop projection 48 which—in the extended state—rests against the gear shaft 32b. The stop projection 48 is designed such that, when a returning force is introduced into the associated locking bolt 26 along the actuation axis B owing to the deflection on the bearing point between the lever 42 and the coupling element 40, this will result in a force being introduced into the gear shaft 32b in a radial direction, with the result that no returning torque will act on the gear shaft 32b. This secures the drive 16 against unintentional opening. A stop each limits the movement of each locking bolt 26 in both the extension and retraction directions with respect to the locking bolt support 44.

Figure 4:
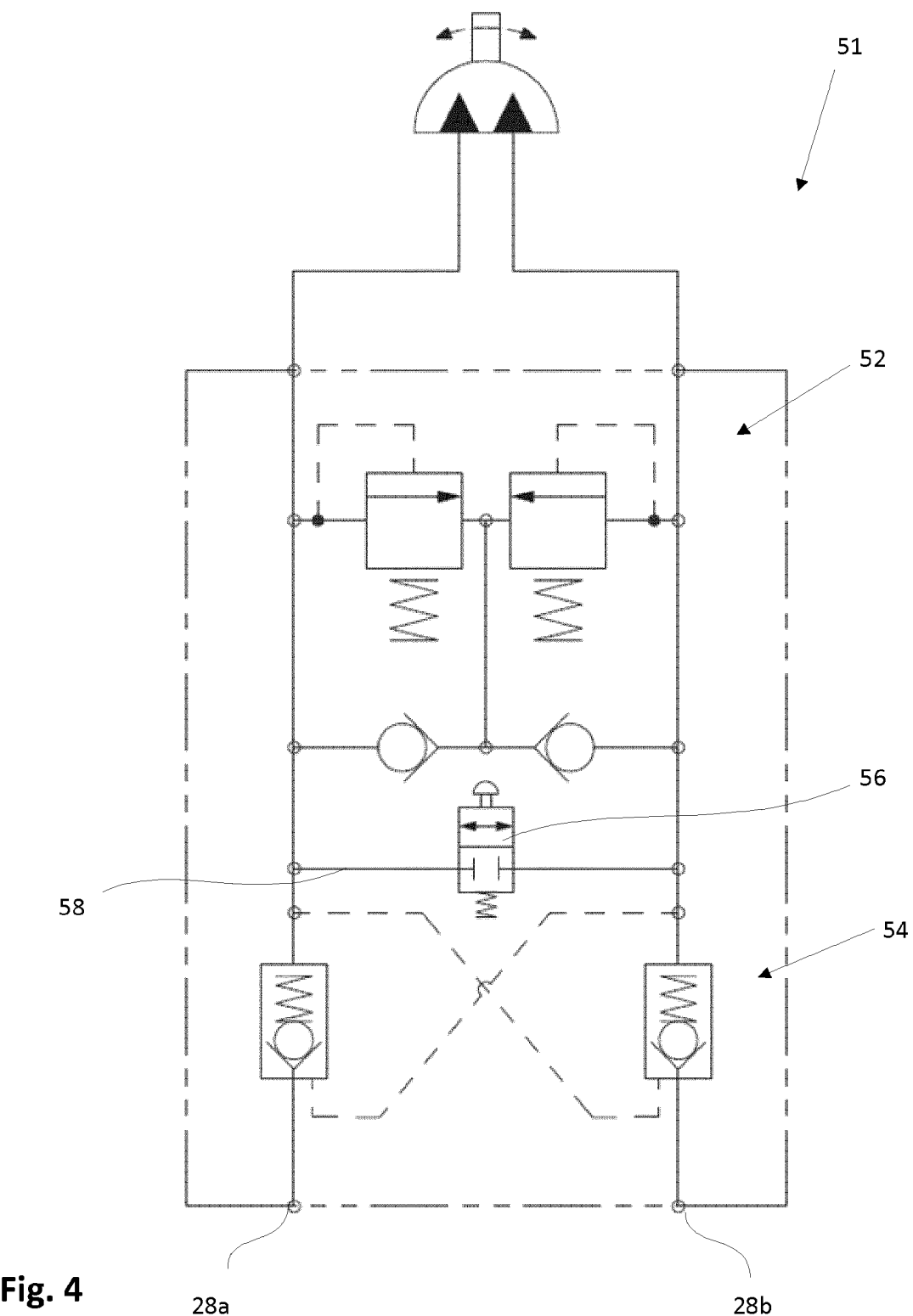
FIG. 4 is a view of a hydraulic circuit including a switch valve.

FIG. 4 is a hydraulic circuit 51 connected upstream the rotary drive 30, with a bypass 58 which can be released via a switch valve 56 being provided besides a load-hold circuit 54 and an excess-pressure circuit 52. Opening the bypass 58 allows the drive 16 to be actuated manually. This makes it possible to change from hydraulic operation over to manual operation.

| List of Reference Characters | |
|---|---|
| 10 | quick-change device |
| 14 | quick-change adapter |
| 16 | drive |
| 20 | receiving unit |
| 22 | claws |
| 24 | abutment |
| 26 | locking bolt |
| 28a, 28b | hydraulic operating connections |
| 30 | rotary drive |
| 32 | gear shaft |
| 32a, 32b | rotary connections |
| 32c | first part of gear shaft 32 |
| 32d | second part of gear shaft 32 |
| 34 | output shaft |
| 34a, 34b | connections |
| 36a, 36b | toggle-lever mechanism |
| 38a, 38b | stop pin |
| 40 | coupling element |
| 42 | lever |
| 44 | locking bolt support |
| 46 | sliding sleeve |
| 48 | stop projection |
| 50 | spring |
| 51 | hydraulic circuit |
| 52 | excess pressure circuit |
| 54 | load-hold circuit |
| 56 | switch valve |
| 58 | bypass |
| M | central axis |

The invention claimed is:

1. A quick-change device, comprising:
a pair of claws (22) at a first end thereof for engagement with a first transversal rod of a quick-change adapter;

a receiving unit at a second end thereof for engagement with a second transversal rod of said quick-change adapter, the receiving unit comprising a pair of abutments and a pair of locking bolts (26), each locking bolt being movable between a retracted unlocking position and an extended locking position along an actuation axis (B) to retain the second transversal rod between the locking bolt and a respective one of the abutments;

a hydraulic or pneumatic rotary drive (30) comprising an output shaft (34) having opposing output shaft ends extending therefrom;

a pair of gear shafts (32*c*, 32*d*), each non-rotatably coupled with a respective end of the output shaft;

a pair of gear shaft drive connections (32*a*, 32*b*), each coupled with a respective one of said gear shafts (32*c*, 32*d*);

wherein each end of said output shaft (34) is detachably connected to a respective one of said gear shafts (32*c*, 32*d*) via a connection plug (34*a*, 34*b*) so as to allow replacement of said rotary drive;

a pair of toggle lever mechanisms (36*a*, 36*b*), each comprising a lever element (42) non-rotatably coupled with a respective one of the gear shaft drive connections (32*a*, 32*b*) and a coupling element (40) rotatably coupled with the lever element at one end thereof and rotatably coupled with a respective one of the locking bolts at an opposing end thereof;

wherein rotation of the output shaft drives the locking bolts via the toggle lever mechanisms between the unlocking position and the unlocking position;

wherein each said coupling element includes a stop projection (48) which abuts a respective one of the gear shafts in the extended locking position of the locking bolts; and wherein one or both of the gear shafts (32*c*, 32*d*) comprise an attachment element (20) integrally formed therewith for manual operation thereof via a manual lever to rotate the gear shafts and toggle lever mechanisms.

2. The quick-change device according to claim 1, wherein:

said rotary drive (30) comprises a piston whose linear movement is converted into rotary movement of the output shaft (34).

3. The quick-change device according to claim 1, wherein:

said rotary drive (30) has a first fluidic connection (28*a*) and a second fluidic connection (28*b*), said first fluidic connection (28*a*) and said second fluidic connection (28*b*) are interconnected via a throttle.

4. The quick-change device according to claim 1, wherein:

said rotary drive (30) has a first fluidic connection (28*a*) and a second fluidic connection (28*b*), said first fluidic connection (28*a*) and said second fluidic connection (28*b*) are interconnected via a bypass (58), said bypass (58) comprises a switch valve (56) for opening and closing the bypass (58);

said switch valve (56) is closed during fluid operation and said switch valve (56) is open during manual operation so as to enable a change-over from external force actuation to manual actuation and vice versa during ongoing operation of said device.

5. The quick-change device according to claim 1, wherein:

said rotary drive (30) includes a first end position and a second end position;

said rotary drive (30) is acted upon by hydraulic fluid retained in said first and second end positions of said drive; and pressure-controlled check valves hold the load.

6. The quick-change device according to claim 1, wherein:

said output shaft (34) is oriented orthogonally relative to the actuation axis of said locking bolts (26).

7. The quick-change device according to claim 1, wherein:

the rotational angle range of said rotary drive (30) is limited to a rotational angle between 0° and 130°.

\* \* \* \* \*